United States Patent
Rastogi et al.

(10) Patent No.: US 11,791,757 B2
(45) Date of Patent: Oct. 17, 2023

(54) EXTENDED BRAKING WITH VARIABLE FREQUENCY DRIVE WITHOUT INPUT POWER

(71) Applicant: Siemens Aktiengesellschaft, Munich (DE)

(72) Inventors: Mukul Rastogi, Delmont, PA (US); Ricardo Martinez, Murrysville, PA (US)

(73) Assignee: Siemens Aktiengesllschaft, Munich (DE)

(*) Notice: Subject to any disclaimer, the term of this patent is extended or adjusted under 35 U.S.C. 154(b) by 437 days.

(21) Appl. No.: 17/281,426

(22) PCT Filed: Nov. 14, 2019

(86) PCT No.: PCT/US2019/061440
§ 371 (c)(1),
(2) Date: Mar. 30, 2021

(87) PCT Pub. No.: WO2020/102508
PCT Pub. Date: May 22, 2020

(65) Prior Publication Data
US 2022/0006412 A1 Jan. 6, 2022

Related U.S. Application Data

(60) Provisional application No. 62/767,760, filed on Nov. 15, 2018.

(51) Int. Cl.
*H02P 27/06* (2006.01)
*H02J 9/06* (2006.01)

(52) U.S. Cl.
CPC .............. *H02P 27/06* (2013.01); *H02J 9/062* (2013.01)

(58) Field of Classification Search
CPC ................................. H02P 27/06; H02J 9/062
See application file for complete search history.

(56) References Cited

U.S. PATENT DOCUMENTS 7,015,599 B2 * 3/2006 Gull .......................... H02J 9/08
307/64
7,508,147 B2 * 3/2009 Rastogi ................... H02M 7/49
318/801

(Continued)

FOREIGN PATENT DOCUMENTS

GB 2394369 A 4/2004

OTHER PUBLICATIONS

PCT International Search Report and Written Opinion of International Searching Authority dated Mar. 3, 2020 corresponding to PCT International Application No. PCT/US2019/061440 filed Nov. 14, 2019.

*Primary Examiner* — Rina I Duda

(57) ABSTRACT

A variable frequency drive system (300) includes a power converter (310) with a plurality of power cells supplying power to one or more output phases (A, B, C), a main power source (320) for providing main input power to the power converter (310), an auxiliary power source (330) for providing auxiliary input power to the power converter (310), and a control system (314) in communication with the power converter (310) and controlling operation of the plurality of power cells, wherein the control system (314) comprises one or more processor(s) (315) configured via computer executable instructions to detect a main input voltage drop of the main power source (320) below a predefined power threshold, disconnect the main power source (320) in response to the main input voltage drop, and enable the auxiliary power source (330) to provide auxiliary input power to the power converter (310) in response to the main input voltage drop.

14 Claims, 5 Drawing Sheets

(56) References Cited

U.S. PATENT DOCUMENTS

| | | | |
|---|---|---|---|
| 7,511,975 B2* | 3/2009 | Hammond | H02H 9/002 |
| | | | 323/908 |
| 8,093,858 B1 | 1/2012 | Kadah et al. | |
| 8,223,515 B2* | 7/2012 | Abolhassani | H02P 13/06 |
| | | | 363/39 |
| 8,279,640 B2* | 10/2012 | Abolhassani | H01F 30/12 |
| | | | 363/37 |
| 2013/0063070 A1 | 3/2013 | Zhang et al. | |
| 2013/0151156 A1 | 6/2013 | Noui-Mehidi et al. | |
| 2017/0159656 A1 | 6/2017 | Tientcheu-Yamdeu et al. | |

* cited by examiner

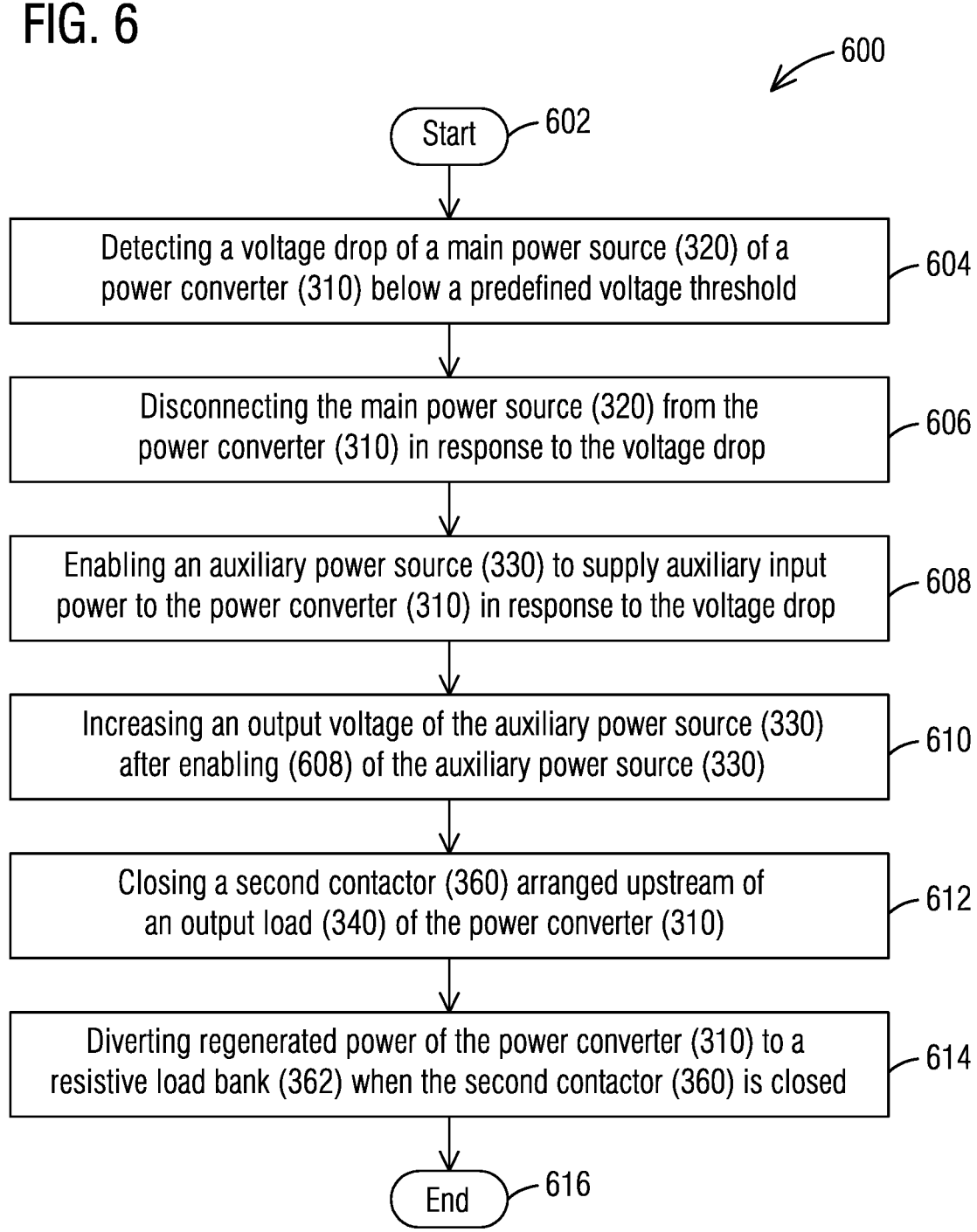

EXTENDED BRAKING WITH VARIABLE FREQUENCY DRIVE WITHOUT INPUT POWER

BACKGROUND

1. Field

Aspects of the present disclosure generally relate to a drive system, such as for example a medium voltage variable frequency drive, with extended braking capabilities. Throughout the specification, the terms "drive", "drive system", "converter", "power converter" and "power supply" can be used interchangeably.

2. Description of the Related Art

Medium voltage (MV) variable frequency drives, such as for example multilevel power converters, are used in applications of medium voltage alternating current (AC) drives, flexible AC transmission systems (FACTS), and High Voltage DC (HVDC) transmission systems, because single power semiconductor devices cannot handle high voltage. Multilevel power converters typically include a plurality of power cells for each phase, each power cell including an inverter circuit having semiconductor switches that are capable of altering the voltage output of the individual cells. One example of a multilevel power converter is a cascaded H-bridge converter system having a plurality of H-bridge cells as described for example in U.S. Pat. No. 5,625,545 to Hammond. Another example of a multilevel power converter is a modular multilevel converter system having a plurality of M2C or M2LC subsystems.

An example of an application of a variable frequency drive (VFD) includes a VFD operating an electric submersible pump (ESP), used for example in the oil and gas industry for pumping oil. An ESP is typically submerged in the fluid to be pumped and comprises for example a pump body with a hermetically sealed electric motor. When input power is lost to the VFD, the electric motor of the ESP begins to decelerate due to reverse torque on the pump from the column of fluid that is present in such applications. The reverse torque is so high as to force the pump to spin in reverse at speeds that exceed the rated speed of the motor and the pump. Such operation is not desirable as it severely stresses the mechanical system including the motor and pump. Currently, in such cases users may simply let the pump to back spin until the column reaches the well level. Customers set up a fixed waiting time for all pumps to assure they are not re-started before the predefine time elapses to assure it is restarted when it is not spinning. Thus, there may exist a need for an improved drive system, specifically when utilized in connection with an ESP.

SUMMARY

Briefly described, aspects of the present disclosure relate to a drive system, embodied for example as a medium voltage variable frequency drive, and a method for controlling such a drive system.

A first aspect of the present disclosure provides a variable frequency drive system comprising a power converter comprising a plurality of power cells supplying power to one or more output phases, a main power source configured to provide main input power to the power converter, an auxiliary power source configured to provide auxiliary input power to the power converter, and a control system in communication with the power converter and controlling operation of the plurality of power cells, wherein the control system comprises at least one processor and is configured via computer executable instructions to detect a main input voltage drop of the main power source below a predefined power threshold, disconnect the main power source in response to the main input voltage drop, and enable the auxiliary power source to provide auxiliary input power to the power converter in response to the main input voltage drop.

A second aspect of the present disclosure provides a method for controlling a variable frequency drive system comprising, through operation of at least one processor, detecting a voltage drop of a main power source of a power converter below a predefined voltage threshold, disconnecting the main power source from the power converter in response to the voltage drop, and enabling an auxiliary power source to supply auxiliary input power to the power converter in response to the voltage drop.

A third aspect of the present disclosure provides a non-transitory computer readable medium encoded with processor executable instructions that when executed by at least one processor, cause the at least one processor to carry out a method for controlling a variable frequency drive system as described herein.

BRIEF DESCRIPTION OF THE DRAWINGS

FIG. 6 illustrates a flow chart of a method for controlling a drive system with extended barking capability in accordance with an exemplary embodiment of the present disclosure.

DETAILED DESCRIPTION

To facilitate an understanding of embodiments, principles, and features of the present disclosure, they are explained hereinafter with reference to implementation in illustrative embodiments. In particular, they are described in the context of being a variable frequency drive, in particular medium voltage (MV) variable frequency drive including multi-cell power supplies such as modular multilevel converter systems and cascaded H-bridge converter systems. Embodiments of the present disclosure, however, are not limited to use in the described devices or methods.

As used herein, a "medium voltage" is a voltage of greater than about 690V and less than about 69 KV, and a "low voltage" is a voltage less than about 690V. Persons of ordinary skill in the art will understand that other voltage levels may be specified as "medium voltage" and "low voltage". For example, in some embodiments, a "medium voltage" may be a voltage between about 3 kV and about 69 kV, and a "low voltage" may be a voltage less than about 3 kV.

Figure 1:
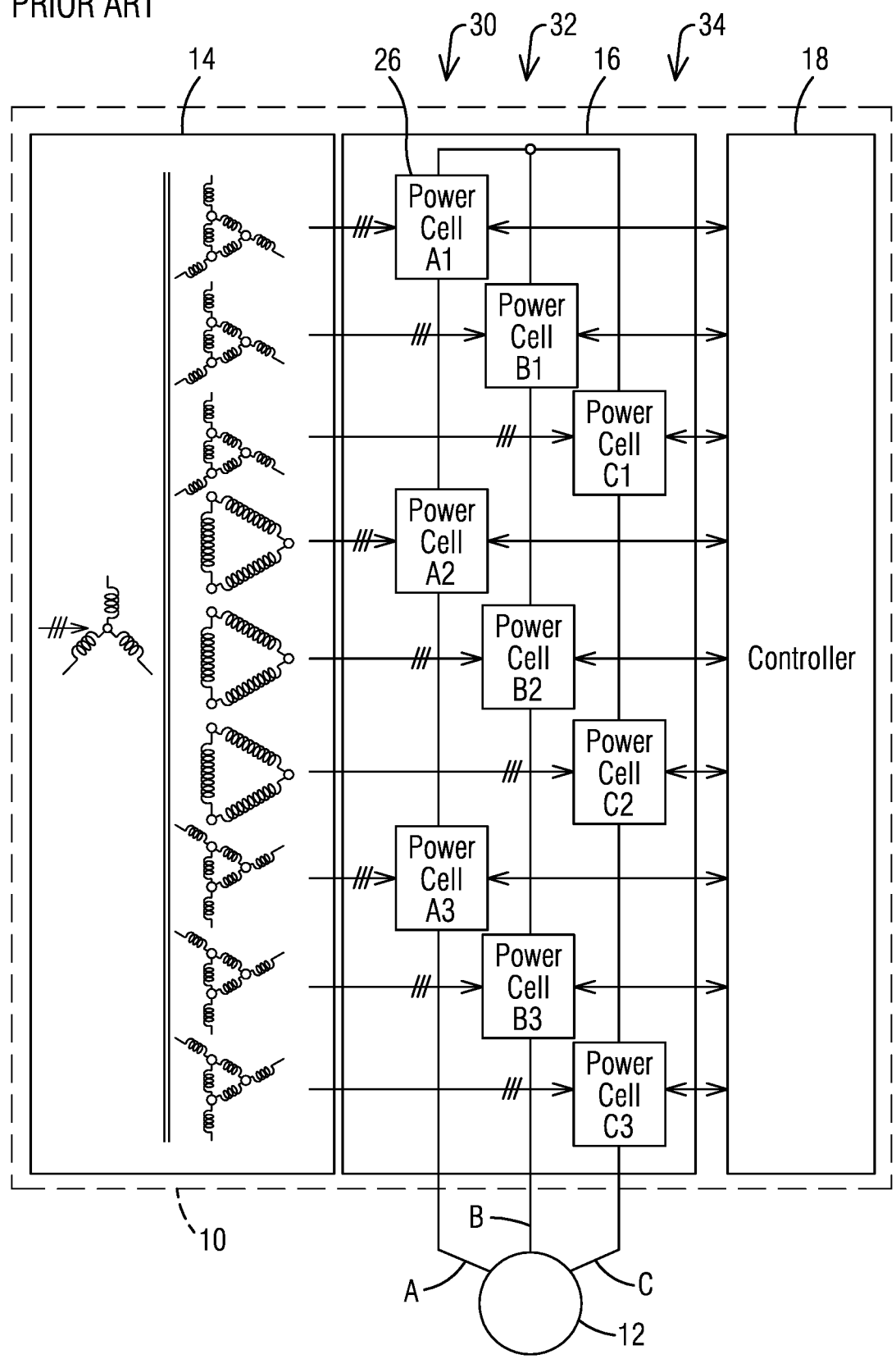
FIG. 1 illustrates a schematic diagram of a known basic configuration of a cascaded H-bridge converter system in accordance with an exemplary embodiment disclosed herein.
Figure 2:
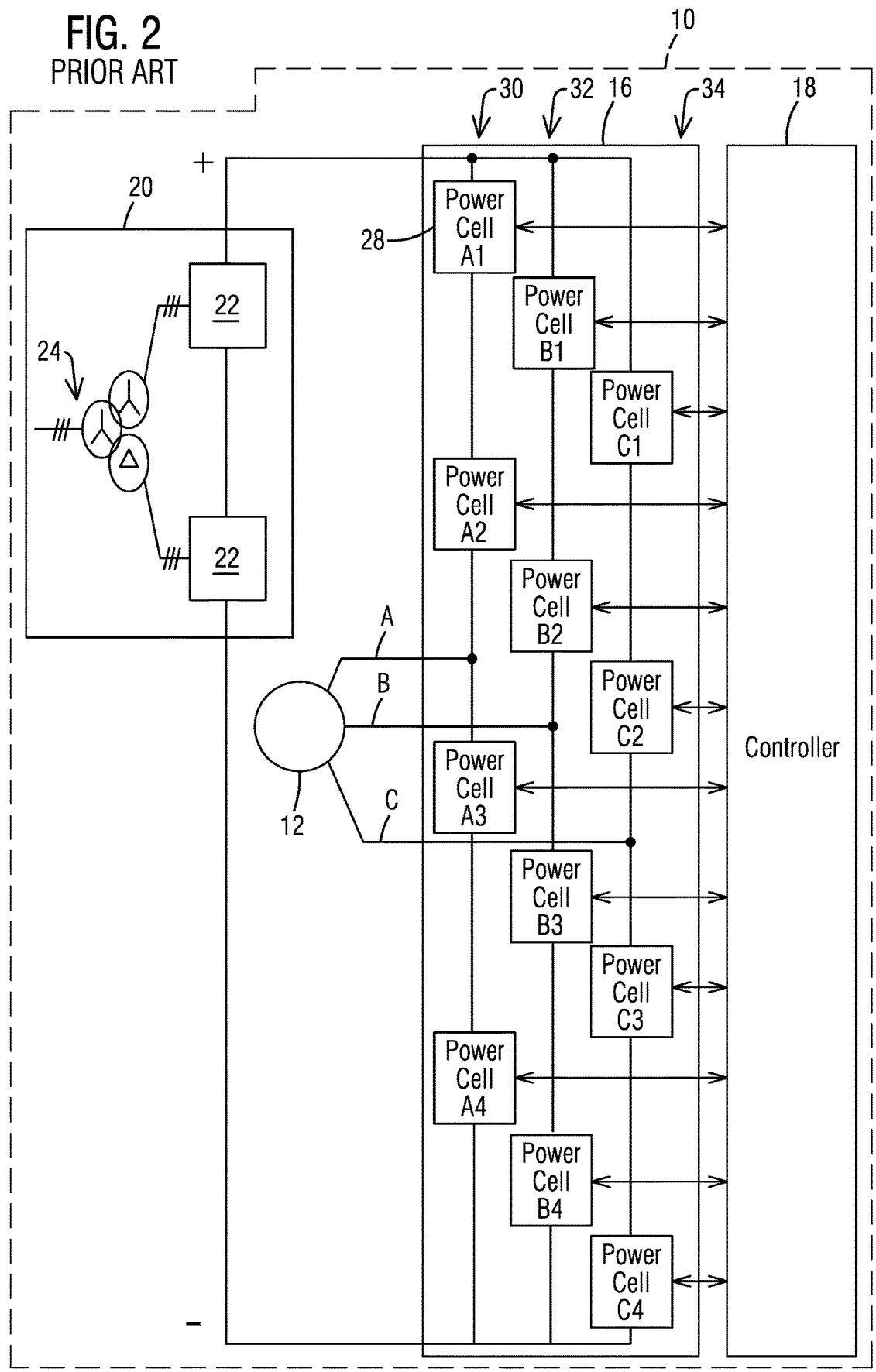
FIG. 2 illustrates a schematic diagram of another known basic configuration of a cascaded H-bridge converter system in accordance with an exemplary embodiment disclosed herein.

FIG. 1 and FIG. 2 each illustrate a schematic of a known multi-cell power supply 10, specifically a cascaded H-bridge converter system that receives three-phase power from an alternating current (AC) source and delivers power to a load 12. The load 12 comprises for example an electric motor. The electric motor may comprise any type AC-type motor, for example, synchronous, asynchronous, permanent magnet, and may be rated for low voltage, medium voltage or high-voltage. For example, medium-voltage AC motors, such as those used in industrial process control, may operate in the 4.16 kV to 13.8 kV range. Greater or lesser voltage may be used. More than one motor may be connected. Other loads may be used instead of or in addition to the motor. The motor responds to the voltage applied by the multilevel converter on the three phases, for example, to increase, decrease or maintain a speed or position.

With reference to FIG. 1, the multi-cell power supply 10 includes a transformer 14, a power circuit 16, and a controller 18, herein also referred to as control system. The transformer 14 includes a primary winding that excites nine secondary windings, and power circuit 16 includes multiple printed circuit board (PCB) power cells 26, herein simply referred to as power cells 26, that are operably coupled to the secondary windings, respectively, of the transformer 14. As the power supply 10 comprises nine secondary windings, and a power cell 26 is operably coupled to each secondary winding, the power supply 10 comprises nine power cells 26. Of course, the power supply 10 can comprise more or less than nine power cells 26 and/or more or less than nine secondary windings depending on a type of the power supply 10 and/or a type of the load 12 coupled to the power supply 10.

The power cells 26 can be rated for lower voltages and are configured to provide a medium voltage output to the load 12. Each output phase A, B, C of the power circuit 16 is fed by a group of series-connected power cells 26. Outputs of the power cells 26 are coupled in series in a first phase group 30, at second phase group 32, and a third phase group 34. Each phase output voltage is a sum of the output voltages of the power cells 26 in the respective phase group 30, 32 and 34. For example, the first phase group 30 comprises power cells 26 labelled A1, A2 and A3, wherein the phase output voltage of the output phase A is the sum of the output voltages of the power cells A1, A2 and A3. The same applies to output phase B and power cells B1, B2, B3, and output phase C and power cells C1, C2, C3. In this regard, the power circuit 16 delivers a medium voltage output to load 12 using lower voltage rated power cells 26 that include components rated to lower voltage standards. Each power cell 26 is coupled, e.g., for example via an optical fiber communication link, to controller 18, which may use current feedback and voltage feedback to control operation of the power cells 26.

As illustrated in FIG. 2, a multi-cell power supply 10 includes three-phase AC power supply 20, a power circuit 16, and a controller 18. The three-phase AC power supply 20 includes two diode bridges 22 which are each connected on the AC voltage side to secondary windings of a power converter transformer 24 and are electrically connected in series on a direct current (DC) voltage side. A positive and a negative DC voltage bus are provided for the parallel connection of these phase groups. The power circuit 16 includes power cells 28 that are coupled to the DC voltage bus created by the power supply 20. The power cells 28 are for example lower voltage rated and are configured to provide medium voltage output to load 12. Although the load 12 may be illustrated as being within the multi-cell power supply 10, the load 12 is not part of the multi-cell power supply 10. Rather, the load 12 is separate from, and connected to, the multi-cell power supply 10, as more clearly shown in FIG. 1.

Each output phase A, B, C of the power circuit 16 is fed by a group of series-connected power cells 28, also labelled A1-A4, B1-B4 and C1-C4 with reference to the output phases A, B, C. The power cells 28 are coupled in series in a first phase group 30, a second phase group 32, and a third phase group 34. Each phase output voltage is a sum of the output voltages of the power cells 28 in the phase group 30, 32 and 34 as described before with reference to FIG. 1. The power circuit 16 delivers a medium voltage output to the load 12 using lower voltage rated power cells 28 that include components rated to lower voltage standards. Each power cell 28 is coupled, e.g., for example via optical fiber communication link(s), to the controller 18, which can use current feedback and voltage feedback to control operation of the power cells 28.

It should be noted that in FIG. 1 and FIG. 2 the number of power cells 26, 28 in each phase group 30, 32, 34 can be between 2 and 12 to provide different medium voltage outputs as required by the load 12. As noted, before, in the embodiment of FIG. 1, the number of secondary windings of transformer 14 matches the number of power cells 26. In the embodiment of FIG. 2, a number of diode bridges and transformer secondary windings can vary from 1 to 6 to allow for harmonic cancellation on the primary side of the transformer 24. It will be appreciated by those of ordinary skill in the art that other cell counts, and diode bridge counts may be used depending upon the application and that the configurations shown and described herein are intended to be exemplary in natures.

Figure 3:
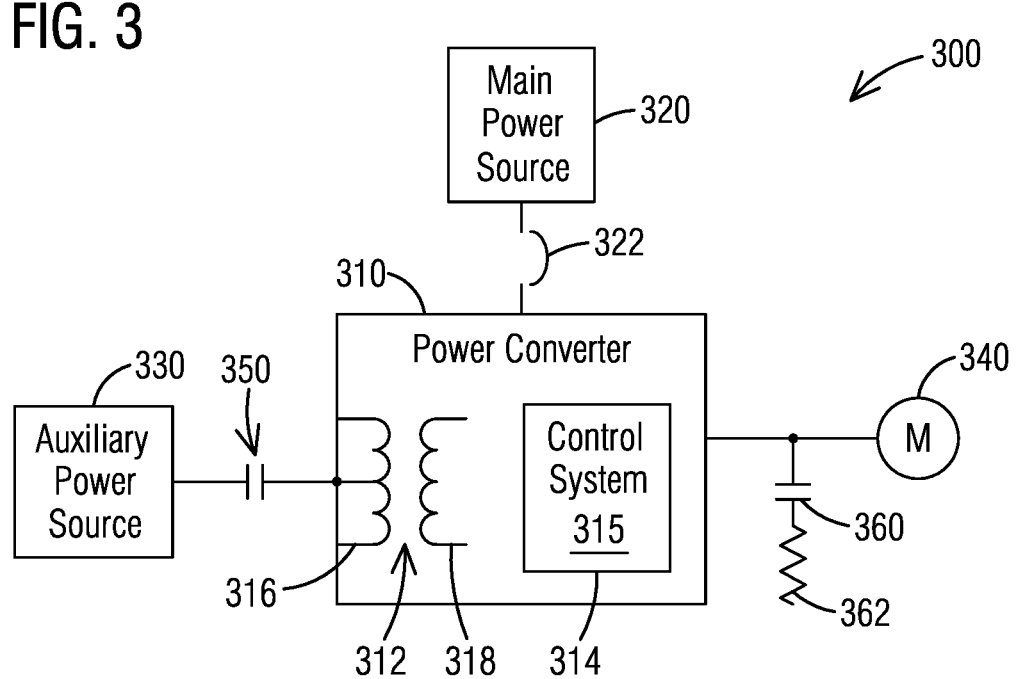
FIG. 3 illustrates a schematic diagram of a first embodiment of a drive system with extended braking capability in accordance with an exemplary embodiment of the present disclosure.

FIG. 3 illustrates a schematic diagram of a first embodiment of a drive system 300 with extended braking capability in accordance with an exemplary embodiment of the present disclosure. The drive system 300 comprises a power converter 310, such as for example a variable frequency drive (VFD). The power converter 310 is only shown schematically without specific details. As described before, for example with reference to FIG. 1 and FIG. 2, a VFD typically comprises a power transformer 312, a control system 314, herein also referred to as controller, and one or more cooling assemblies etc. The one or more cooling assemblies may be configured as air-cooling assembly, as water-cooling assembly or a combination of both. The power transformer 312 converts an input voltage to a usable voltage for the power converter 310. The power converter 310 converts the voltage from the power transformer 312 using stages for rectification and inversion to provide a variable frequency and a variable voltage at an output load 340.

In an embodiment, the power converter 310 may comprise multiple power cells as described before. The control system 314 of the power converter 310 regulates and controls operation of the drive components via a data connection, such as data bus, to provide a required frequency and voltage at the output load 340 based on commands, for example previously stored in the controller 314 or received from an external control system, such as a customer control system. In addition, the controller 314 performs drive protection functions and provides drive status to the customer or user of the drive system 300.

The load 340 comprises for example an electric motor. The electric motor may comprise any type AC-type motor, for example, synchronous, asynchronous, permanent magnet, and may be rated for low voltage, medium voltage or high-voltage. For example, medium-voltage AC motors, such as those used in industrial process control, may operate in the 4.16 kV to 13.8 kV range. Greater or lesser voltage may be used. More than one motor may be connected. Other loads may be used instead of or in addition to the motor. The motor responds to the voltage applied by the multilevel converter on the three phases, for example, to increase, decrease or maintain a speed or position.

In an example, the load 340 comprises an electric submersible pump (ESP), used for example in the oil and gas industry for pumping oil. An ESP is typically submerged in the fluid to be pumped and comprises for example a pump body with a hermetically sealed electric motor.

As described before, when input power is lost to the VFD, the electric motor of the ESP begins to decelerate due to reverse torque on the pump from the column of fluid that is present in such applications. The reverse torque can be so high as to force the pump to spin in reverse at speeds that exceed the rated speed of the motor and the pump. Such operation is not desirable as it severely stresses the mechanical system including the motor and pump. Such input power losses may be caused by network issues of the electrical gird or other electrical circuit issues. Thus, an improved drive system 300 is provided.

In accordance with an exemplary embodiment of the present disclosure, the drive system 300 comprises a main power source 320 configured to provide main input power to the power converter 310, and an auxiliary power source 330 configured to provide auxiliary input power to the power converter 310. Control system 314 comprises at least one processor 315 and is configured via computer executable instructions to detect a main input voltage drop of the main power source 320 below a predefined threshold, disconnect the main power source 320 in response to the main input voltage drop, and enable the auxiliary power source 330 to provide auxiliary input power to the power converter 310 in response to the main input voltage drop.

In an example, the power converter 310 is configured as medium voltage variable frequency drive, and the main power source 320 is configured as medium voltage power source. The auxiliary power source 330 is configured as low voltage power source. As used herein, a "medium voltage" is a voltage of greater than about 690V and less than about 69 KV, and a "low voltage" is a voltage less than about 690V. Persons of ordinary skill in the art will understand that other voltage levels may be specified as "medium voltage" and "low voltage". For example, in some embodiments, a "medium voltage" may be a voltage between about 3 kV and about 69 kV, and a "low voltage" may be a voltage less than about 3 kV.

The main input power source 320 provides input voltage. The predefined threshold comprises a voltage threshold, the voltage threshold comprising a percentage of the regular (nominal) input voltage. For example, the voltage threshold may comprise 55% of the main input voltage. This means, that when the main input voltage drops below 55% of the regular (nominal) input voltage of the main power source 320, the control system 314 detects a voltage drop. However, it should be noted that the percentage of 55% is only one example for a threshold. The threshold can be many other input voltage percentages or values of the regular input voltage, for example 70% or 45%, depending on for example specific requirements or circumstances.

The power converter 310 further comprises an internal transformer 312. The internal transformer 312 comprises a primary winding 316 and a secondary winding 318. The auxiliary input power of the auxiliary power source 330 is supplied to the internal transformer 312, specifically to the primary winding 316.

The drive system 300 further comprises upstream circuit breaker 322, wherein the control system 314 is configured to disconnect the main power source 320 via the upstream circuit breaker 322 in response to the main input voltage drop.

The drive system 300 further comprises a first contactor 350 arranged between the auxiliary power source 330 and the power converter 310, wherein the auxiliary power source 330 is connected to the power converter 310 via the first contactor 350 in response to the main input voltage drop. In an embodiment, the closing of the first contactor 350 may be considered as enablement of the auxiliary power source 330. For example, after receiving acknowledgement by the control system 314 that the circuit breaker 322 has been opened and the main power source 320 disconnected, the first contactor 350 is commanded to close by the control system 314.

In another embodiment, the auxiliary power source 330 can be continuously connected to the power converter 310. In this case, the first contactor 350 may always be closed. In another example, the system 300 may not comprise a contactor between auxiliary power source 330 and power converter 310, and the auxiliary power system 330 may always be operably coupled to the power converter 310 via electrical means. This embodiment may be referred to as "online auxiliary power source". In this case, the power converter 310 is kept energized since the auxiliary power source 330 is operably connected to the power converter 310 at all times. As soon as the input voltage of the main power source 320 drops below the predefined voltage threshold, the auxiliary input power of the auxiliary power source 330 is available to the power converter 310.

After enablement, for example closing of the first contactor 350, the auxiliary power source 330 increases its output voltage, the output voltage providing auxiliary input voltage to the power converter 310, specifically the internal transformer 312 (primary winding 316). For example, the control system 314 is configured to command the auxiliary power source 330 to ramp up its output voltage from 0V (zero volts) to 100% voltage within a certain time, for example in less than 200 ms (milliseconds). It should be noted that 200 ms is only one example and that other times, less or more than 200 ms, for increasing the voltage are possible. As described before, the auxiliary power source 330 feeds the internal transformer 312, specifically the primary winding 316, wherein the internal transformer 312 provides feedback to the control system 314 when the 100% voltage has been reached. In case of an online auxiliary power source, the status feedback of the internal transformer 312 will be present all the time.

The drive system 300 further comprises a second contactor 360 arranged between the power converter 310 and an output load 340 of the power converter 310, wherein the control system 314 is further configured to close the second contactor 360 when the power converter 310 reaches a predefined value of its nominal input voltage. For example, once the primary winding 316 of the internal transformer 312 reaches about 70% of its nominal input voltage, the second contactor 360 is commanded to close by the control system 314. It should be noted that the percentage of 70% is only one example for a threshold, and the threshold can be many other percentages or values, for example 60% or 80% of the nominal input voltage of the primary winding 316, depending on for example specific requirements or circumstances. When the second contactor 360 is closed, regenerated power of the power converter 310 is diverted to a resistive load bank 362.

With reference to our example that the load 340 comprises an electric submersible pump (ESP) and main input voltage of the main power source 320 is lost to the power converter 310, the electric motor of the ESP begins to decelerate due to reverse torque on the pump from a fluid column that is present in such applications. The reverse torque is so high as to force the pump to spin in reverse at speeds that exceed the rated speed of the motor and the pump. As long as a shaft speed of the ESP motor is positive, the power converter 310 will keep motor nominal flux (V/Hz ratio) and motor slip close to zero; thus, there is no active power coming in or out of the power converter 310. When the shaft speed becomes negative, it is expected that the ESP motor increases magnitude to a value lower than rated motor and pump speed, and then it will decrease in magnitude in function of a reduction of the fluid column. The power converter 310 will follow that frequency of the shaft maintaining the ESP motor magnetized and its slip will be negative because regenerated power of the power converter 310 is diverted to the load resistor bank 362.

Once the ESP motor frequency reaches zero Hz, the power converter 310 will, through operation of the at least one processor 315 of the control system 314, stop supplying power, open the second contactor 360 upstream the ESP (load 340), disable (turn off) the auxiliary power source 330 (when applicable) and/or open the first contactor 350, connect the main input power source 320 by closing the circuit breaker 322, and the power converter 310 will be ready for energization and operation.

Figure 4:
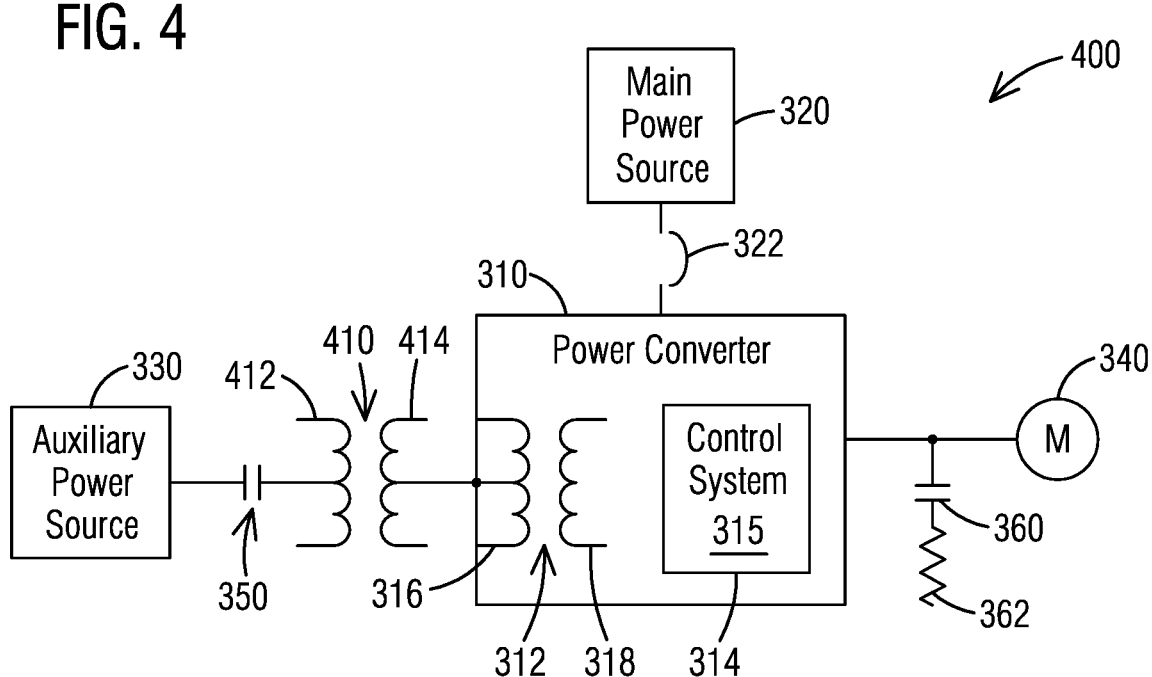
FIG. 4 illustrates a schematic diagram of a second embodiment of a drive system with extended braking capability in accordance with an exemplary embodiment of the present disclosure.

FIG. 4 illustrates a schematic diagram of a second embodiment of a drive system 400 with extended braking capability in accordance with an exemplary embodiment of the present disclosure. The drive system 400 generally corresponds to the drive system 300 as described with reference to FIG. 3. In addition to the components of the drive system 300, the drive system 400 comprises an isolation transformer 410 with primary winding 412 and secondary winding 414. The optional isolation transformer 410 is coupled to the power converter 310, specifically internal transformer 312. One of ordinary skill in the art is familiar with isolation transformers and thus it will not be described in further detail herein. In an embodiment, the isolation transformer 410 is configured as low voltage isolation transformer when the auxiliary power source 330 is configured as low voltage power source.

Figure 5:
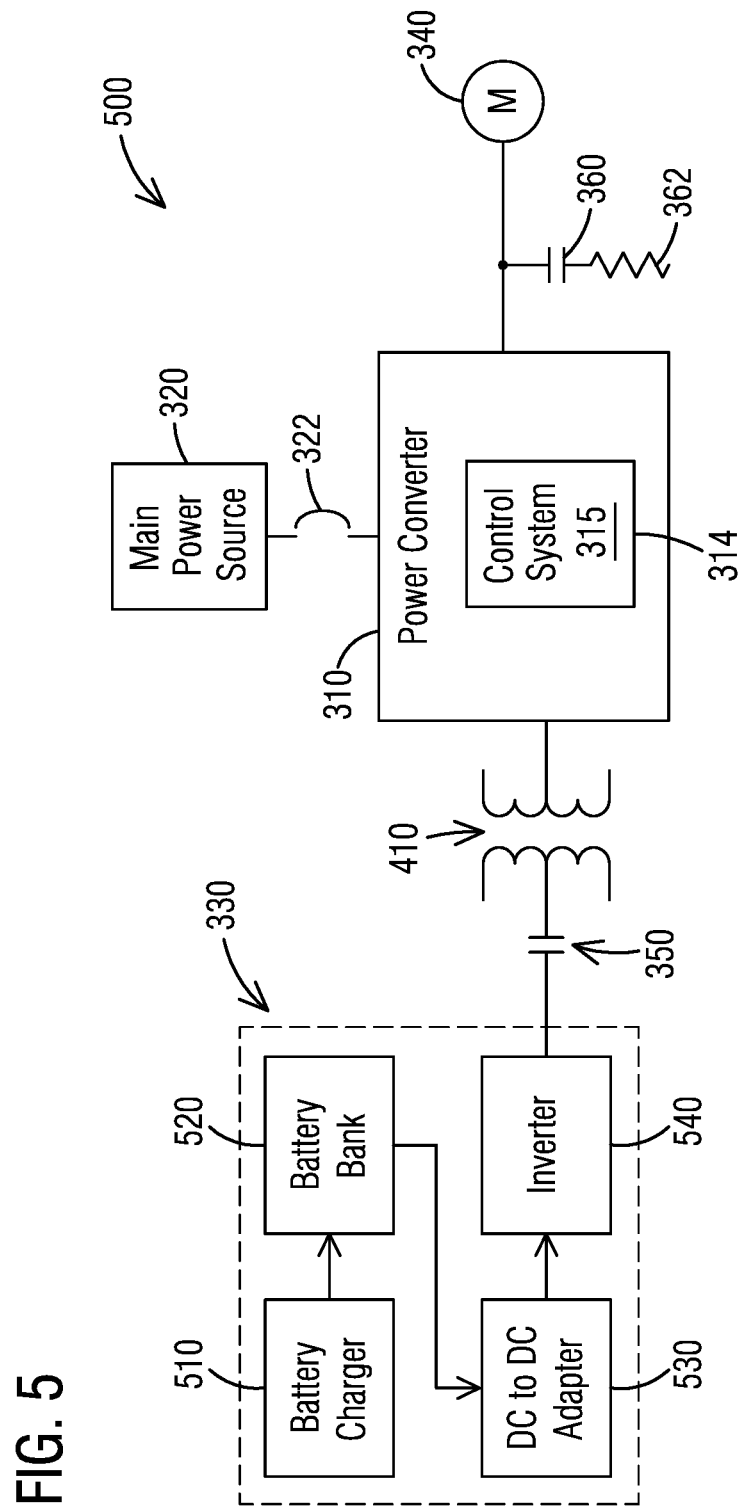
FIG. 5 illustrates a schematic diagram of a third embodiment of a drive system with extended braking capability in accordance with an exemplary embodiment of the present disclosure.

FIG. 5 illustrates a schematic diagram of a third embodiment of a drive system 500 with extended braking capability in accordance with an exemplary embodiment of the present disclosure. The drive system 500 comprises components of drive systems 300, 400 as described before with reference to FIG. 3 and FIG. 4. Specifically, drive system 500 comprises power converter 310 with control system 314 including at least one processor 315, main power source 320 connectable and dis-connectable to the power converter 310 via circuit breaker 322 and output load 340 comprising for example an electric motor of an ESP. Further, drive system 500 comprises first contactor 350, second contactor 360, resistive load bank 362, and optional isolation transformer 410.

The drive system 500 further comprises an exemplary embodiment of an auxiliary power source 330. The exemplary embodiment of the auxiliary power source 330 comprises a battery bank 520 with one or more electric batteries. Such batteries may include for example industrial batteries, ultracapacitors etc. The auxiliary power source 330 further comprises a battery charger 510 for charging the battery bank 520, an adapter 530, specifically a DC (direct current) to DC adapter and an inverter 540. The inverter 540 can be configured as low voltage inverter when the auxiliary power source 330 is configured as low voltage power source.

Other embodiments of the auxiliary power source 330 may include for example one or more auxiliary generator(s), one or more flywheel(s) or similar power sources.

FIG. 6 illustrates a flow chart 600 of a method for controlling a variable frequency drive system in accordance with an exemplary embodiment of the present disclosure. The variable frequency drive system can be configured as drive system 300, 400 or 500 as described with reference to FIG. 3, FIG. 4 or FIG. 5. The illustrated method 600 facilitates controlling function. While the method 600 is described as being a series of acts that are performed in a sequence, it is to be understood that the method 600 may not be limited by the order of the sequence. For instance, unless stated otherwise, some acts may occur in a different order than what is described herein. In addition, in some cases, an act may occur concurrently with another act. Furthermore, in some instances, not all acts may be required to implement a methodology described herein.

The method 600 may start at 602 and may include, through operation of at least on processor (315), an act 604 of detecting a voltage drop of a main power source 320 of a power converter 310 below a predefined voltage threshold. The method 600 may further include an act 606 of disconnecting the main power source 320 from the power converter 310 in response to the voltage drop, and an act 608 of enabling an auxiliary power source 330 to supply auxiliary input power to the power converter 310 in response to the voltage drop.

It should be appreciated that this described methodology 600 may include additional acts and/or alternative acts corresponding to the features described previously with respect to the drive system 300, 400 or 500 (see FIG. 3, FIG. 4 and FIG. 5).

For example, act 608 of enabling may comprise operably connecting the auxiliary power source 330 to the power converter 310 by closing a first contactor 350. The method 600 may further include an act 610 of increasing an output voltage of the auxiliary power source 330, after enabling 608 of the auxiliary power source 330. The output voltage provides the auxiliary input power to the power converter 310.

The method 600 may further include one or more act(s) of closing a second contactor 360, act 612, arranged upstream of an output load 340 of the power converter 310, and diverting, act 614, regenerated power of the power converter 310 to a resistive load bank 362 when the second contactor 360 is closed. For example, the second contactor 360 closes when a primary winding 316 of the transformer 312 reaches a predefined percentage of a nominal input voltage of the primary winding 316. At 616, the methodology may end.

The method 600 may further include one or more act(s) of, when a frequency of the output load 340 corresponds to essentially zero (0) Hertz (Hz), opening the second contactor 360, opening the first contactor 350, connecting the main power source 320 to the power converter 310, for example by closing the circuit breaker 322, and energizing the power converter 310. In an example, the output load 340 comprises an electric submersible pump (ESP) with an electric motor, the frequency being a frequency of the electric motor.

The drive system 300, 400, 500 and its components are controlled by the control system 314 of the power converter 310 for fast transferring to the backup auxiliary power source 330 before the power converter 310 (VFD) trips due to voltage loss of main power source 320. Such a voltage loss may be caused by network issues of the electrical grid or other electrical circuit issues. Immediately after, the resistive load bank 362 (load resistors) are connected to the output of the power converter 310 (VFD) for diverting kinetic energy of fluid returning to the well to the load resistors 362. The power converter 310 keeps the electric motor (load 340) of the ESP magnetized with almost zero power supplied to the load or the load resistors 362. In an embodiment, the backup auxiliary power source 330 can keep the power converter 310 (VFD) energized for up to thirty (30) minutes and will only supply its power losses. Of course, depending on power resources, the auxiliary power source 330 may be able to keep the power converter 310 energized for more than 30 minutes, for example up to sixty (60) minutes. The described system 300, 400, 500 and method 600 prevents down-hole pump damage due to the undesirable high-speed backspin due to the discharge of the hydraulic column that actually occurs during power outages.

In another exemplary embodiment, a similar solution for a drive system can be implemented with a 4Q (four quadrant or regenerative) medium voltage VFD. A difference is to connect braking load resistors (resistive load bank 362) at an input of the drive (power converter 310) instead of the connecting the resistors at the drive output. With such a solution, the (low voltage) auxiliary power source can be disregarded. However, a 4Q solution is more expensive than the proposed solution for a 2Q (two-quadrant) drive system.

It should be appreciated that acts associated with the above-described methodologies, features, and functions (other than any described manual acts) may be carried out by one or more data processing systems, such as for example control system 314 via operation of at least one processor 315. As used herein a processor corresponds to any electronic device that is configured via hardware circuits, software, and/or firmware to process data. For example, processors described herein may correspond to one or more (or a combination) of a microprocessor, CPU, programmable logic controller (PLC) or any other integrated circuit (IC) or other type of circuit that is capable of processing data in a data processing system. As discussed previously, the processor 315 that is described or claimed as being configured to carry out a particular described/claimed process or function may correspond to a CPU that executes computer/processor executable instructions stored in a memory in form of software and/or firmware to carry out such a described/claimed process or function. However, it should also be appreciated that such a processor may correspond to an IC that is hard wired with processing circuitry (e.g., an FPGA or ASIC IC) to carry out such a described/claimed process or function.

In addition, it should also be understood that a processor that is described or claimed as being configured to carry out a particular described/claimed process or function may correspond to the combination of the processor 315 with the executable instructions (e.g., software/firmware apps) loaded/installed into a memory (volatile and/or non-volatile), which are currently being executed and/or are available to be executed by the processor 315 to cause the processor 315 to carry out the described/claimed process or function.

Thus, a processor that is powered off or is executing other software, but has the described software installed on a data store in operative connection therewith (such as on a hard drive or SSD) in a manner that is setup to be executed by the processor (when started by a user, hardware and/or other software), may also correspond to the described/claimed processor that is configured to carry out the particular processes and functions described/claimed herein.

In addition, it should be understood, that reference to "a processor" may include multiple physical processors or cores that are configures to carry out the functions described herein. Further, it should be appreciated that a data processing system may also be referred to as a controller that is operative to control at least one operation.

It is also important to note that while the disclosure includes a description in the context of a fully functional system and/or a series of acts, those skilled in the art will appreciate that at least portions of the mechanism of the present disclosure and/or described acts are capable of being distributed in the form of computer/processor executable instructions (e.g., software and/or firmware instructions) contained within a data store that corresponds to a non-transitory machine-usable, computer-usable, or computer-readable medium in any of a variety of forms. The computer/processor executable instructions may include a routine, a sub-routine, programs, applications, modules, libraries, and/or the like. Further, it should be appreciated that computer/processor executable instructions may correspond to and/or may be generated from source code, byte code, runtime code, machine code, assembly language, Java, JavaScript, Python, Julia, C, C #, C++ or any other form of code that can be programmed/configured to cause at least one processor to carry out the acts and features described herein. Still further, results of the described/claimed processes or functions may be stored in a computer-readable medium, displayed on a display device, and/or the like.

The invention claimed is:

1. A variable frequency drive system comprising:
 a power converter comprising a plurality of power cells supplying power to one or more output phases,
 a main power source configured to provide main input power to the power converter,
 an auxiliary power source configured to provide auxiliary input power to the power converter, and
 a control system in communication with the power converter and controlling operation of the plurality of power cells,
 wherein the control system comprises at least one processor and is configured via computer executable instructions to
  detect a main input voltage drop of the main power source below a predefined power threshold,
  disconnect the main power source in response to the main input voltage drop, and
  enable the auxiliary power source to provide auxiliary input power to the power converter in response to the main input voltage drop,
 further comprising a first contactor arranged between the auxiliary power source and the power converter, wherein the auxiliary power source is connected to the power converter via the first contactor in response to the main input voltage drop,
 further comprising a second contactor arranged between the power converter and an output load of the power converter, wherein the control system is further configured to close the second contactor when the power converter reaches a predefined value of its nominal input voltage, wherein regenerated power is diverted to a resistive load bank when the second contactor is closed, wherein the control system is further configured to:
when a frequency of the output load corresponds to essentially zero (0) Hertz (Hz):
open the second contactor,
open the first contactor,
connect the main power source to the power converter, and
energize the power converter.

2. The variable frequency drive system as claimed in claim 1, wherein the main input power comprises input voltage and the predefined power threshold comprises an input voltage threshold, the input voltage threshold comprising a percentage of the input voltage.

3. The variable frequency drive system as claimed in claim 1, further comprising an upstream circuit breaker, wherein the control system is configured to disconnect the main power source via the upstream circuit breaker in response to the main input voltage drop.

4. The variable frequency drive system as claimed in claim 1, wherein the power converter comprises a transformer, the auxiliary input power being supplied to the transformer.

5. The variable frequency drive system as claimed in claim 1, wherein the auxiliary power source increases an output voltage after being enabled, the output voltage providing auxiliary input voltage to the power converter.

6. The variable frequency drive system as claimed in claim 1, wherein the auxiliary power source is continuously connected to the power converter.

7. The variable frequency drive system as claimed in claim 1, wherein the auxiliary power source is configured as low voltage power source.

8. The variable frequency drive system as claimed in claim 1, wherein the output load comprises an electric submersible pump with integrated electric motor.

9. A method for controlling a variable frequency drive system comprising through operation of at least one processor:
detecting a voltage drop of a main power source of a power converter below a predefined voltage threshold,
disconnecting the main power source from the power converter in response to the voltage drop, and
enabling an auxiliary power source to supply auxiliary input power to the power converter in response to the voltage drop, wherein enabling comprises operably connecting the auxiliary power source to the power converter by closing a first contactor,
closing a second contactor arranged upstream of an output load of the power converter, and
diverting regenerated power of the power converter to a resistive load bank when the second contactor is closed, and further comprising:
when a frequency of the output load corresponds to essentially zero (0) Hertz (Hz):
opening the second contactor,
opening the first contactor,
connecting the main power source to the power converter, and
energizing the power converter.

10. The method for controlling a variable frequency drive system as claimed in claim 9, further comprising:
increasing an output voltage of the auxiliary power source after enabling of the auxiliary power source, the output voltage providing the auxiliary input power to the power converter.

11. The method for controlling a variable frequency drive system as claimed in claim 9, further comprising:
supplying the auxiliary input power to a transformer of the power converter.

12. The method for controlling a variable frequency drive system as claimed in claim 9, wherein the second contactor closes when a primary winding of the transformer reaches a predefined percentage of a nominal input voltage of the primary winding.

13. The method for controlling a variable frequency drive system as claimed in claim 9, wherein the output load comprises an electric submersible pump with an electric motor, the frequency being a frequency of the electric motor.

14. A non-transitory computer readable medium encoded with processor executable instructions that when executed by at least one processor, cause the at least one processor to carry out a method for controlling a variable frequency drive system as claimed in claim 9.

* * * * *